United States Patent Office 3,215,709
Patented Nov. 2, 1965

3,215,709
NOVEL N-FLUOROIMINOCYANO COMPOUNDS
AND THEIR SYNTHESIS
Anestis L. Logothetis, Wilmington, Del., assignor to E. I. du Pont de Nemours and Company, Wilmington, Del., a corporation of Delaware
No Drawing. Filed Apr. 12, 1962, Ser. No. 186,871
20 Claims. (Cl. 260—349)

This invention relates to, and has as its principal objects provision of, certain novel N-fluoroiminocyano compounds and the preparation of the same.

The new N-fluoroiminocyano compounds of this invention are those of the general formula

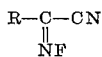

in which R is halogen, particularly fluorine or chlorine, amino, cyano, hydrocarbonoxy, particularly alkoxy of up to 19 carbons or cycloalkoxy of up to 7 carbons, R'OCO— (alkoxycarbonyl), R'CO— (carbacyl), R'COO— (carbacyloxy) or R'COOCH$_2$— (carbacyloxymethylene), R' being alkyl of up to 19 carbons, SF$_5$— (sulfur pentafluoride), ArSO$_2$— (arylsulfonyl) wherein Ar is monovalent aryl hydrocarbon of up to 7 carbons, N$_3$— (azido), or R$^2$S— (thio), —NHR$^2$ or —NR$_2$$^2$ (hydrocarbon-substituted amino), R$^2$ being alkyl of up to 19 carbons, cycloalkyl of up to 8 carbons or monovalent aryl hydrocarbon of up to 17 carbons.

A first process aspect of the invention yields compounds of the above general formula in which R(R$^3$) is fluorine, chlorine, alkoxy, cycloalkoxy, alkoxycarbonyl, carbacyl, carbacyloxy, carbacycloxymethylene or sulfur pentafluoride. It proceeds by the interaction of tetrafluorohydrazine (dinitrogen tetrafluoride) and certain vinyl precursors according to the following scheme:

(I) 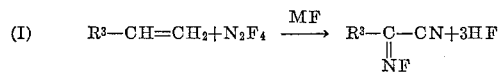

Here R$^3$ is as evident above and MF is an alkali metal fluoride used as a hydrogen fluoride acceptor. Examples I through V, below, illustrate this first process aspect.

In a preferred method of accomplishing this process aspect of the invention, a pressure reactor is charged with a mixture of tetrafluorohydrazine and monoolefinic compound and an amount of alkali metal fluoride slightly more than equivalent to the hydrogen fluoride liberated in the reaction and, desirably, a normally liquid reaction medium inert to the reactants and reaction products. The reactor is closed and the contents are heated to between 60° and 175° C. for from 30 minutes to 10 hours. Thereafter, the reaction mixture is allowed to cool to ambient temperature, the reactor is discharged, and the contents subjected to distillation under reduced pressure to recover the desired products.

Tetrafluorohydrazine is a known chemical compound which can be prepared by the thermal reaction of NF$_3$ with various metals, e.g., stainless steels, copper, etc., according to the equation,

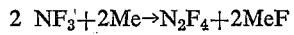

(U.S. Department of Commerce, Office of Technical Services, "Nitrogen Fluorides and Their Organic Derivatives, a Literature Review," LMSD–703005, page 10).

Any alkali metal fluoride can be used as a hydrogen fluoride acceptor but, since the best results are obtained with sodium and cesium fluorides, these fluorides are the ones generally used.

In the reaction of Equation I, there can be employed any monoolefinic or vinyl compound of the formula R$^3$—CH=CH$_2$, R$^3$ being fluorine, chlorine, cyano, alkoxy of up to 19 carbons, cycloalkoxy of up to 7 carbons, R'OCO—, R'CO—, R'COO— or R'COOCH$_2$—, R' being alkyl of up to 19 carbons, or SF$_5$—. Examples of such compounds are vinyl chloride, vinyl fluoride, vinyl acetate, vinyl propionate, vinyl decanoate, vinyl dodecanoate, acrylonitrile, methyl and ethyl propenoates, methyl, ethyl, octyl, dodecyl, and octadecyl acrylates, allyl acetate, allyl propionate, allyl dodecanoate, allyl stearate, methyl vinyl ether, hexyl vinyl ether, tetradecyl vinyl ether, octadecyl vinyl ether, cyclohexyl vinyl ether, methyl vinyl ketone, butyl vinyl ketone, hexadecyl vinyl ketone, vinyl sulfur pentafluoride, and the like.

The order in which the reactants are added to the reactor is not critical. For convenience, it is preferred to add the olefin, reaction medium, if any, and alkali metal fluoride to the reactor, and then inject the tetrafluorohydrazine.

Any pressure reactor can be employed which is resistant to the reactants and reaction products under the conditions prevailing. Suitable reactors are those fabricated from nickel-iron-molybdenum alloys, e.g., "Hastelloy" C. The experiments which constitute Examples I through V were carried out in reactors made from such alloys. The size of the reactor is not critical, the particular size being dependent upon the amount of reactants used.

The reaction is generally carried out under autogenous pressure but externally applied pressure can be used, if desired. These have no practical advantage but tend to complicate equipment design and increase costs.

The reaction temperature can range from 60° to 175° C. Since best results from the standpoint of product yield and reaction rate are realized within the narrower range of 75° to 150° C., the reaction is usually carried out within the latter range. Heating can be in one step, i.e., at a single temperature within the stated range, as illustrated by Example IV, or it can be stepwise, as illustrated by Examples I, II, and III. Stepwise heating is desirable in instances where the reaction can become uncontrolled and proceed explosively or where tar formation occurs. By employing the stepwise procedure the addition can be effected at one temperature and the elimination of HF made to take place at a different temperature. The reactions of addition and elimination are as follows:

(II) 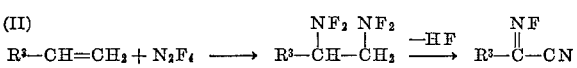

In some instances, as illustrated by Example V, it is desirable to effect the addition as one reaction, add the alkali metal fluoride and effect the HF elimination as a second and separate reaction. Whether the reactions of addition and elimination are effected simultaneously, successively, or as separate reactions depends upon the individual olefin being reacted with the tetrafluorohydrazine.

The time of reaction is variable and depends upon the olefin being reacted and the temperature employed. Usually the reaction will be carried out for at least 15 minutes. However, extending it beyond five hours results in no increase in yield of desired product and this period sets a practical upper limit of reaction time.

The reaction can be carried out in the presence or absence of an added normally liquid reaction medium which is unreactive with the reactants and reaction products. The amount of reaction medium is not critical and it can equal or exceed the weight of the reactants of many fold. Suitable reaction media are ortho- and meta-dichlorobenzenes, acetonitrile, carbon tetrachloride, trichlorofluoromethane, 1,1,2 - trichloro-1,2,2 - trifluoroethane, diethyl ether, and the like.

The monoolefinic compound and tetrafluorohydrazine theoretically react in equimolar proportions to produce one mole of the desired N-fluoroiminocyano compound and three moles of hydrogen fluoride. In practice, either the tetrafluorohydrazine or monoolefinic compound can be used in excess and the excess reactant bled to the atmosphere after reaction is complete. The amount of alkali metal fluoride required to react with the hydrogen fluoride liberated in the reaction is three moles. It is generaly desirable, however, to employ a large excess over the theoretically required three moles. If incomplete reaction is tolerable, an excess or deficiency of any reactant can be used.

In a second process aspect of the invention are produced the remaining compounds of the general formula, i.e., those in which $R(R^4)$ is amino, arylsulfonyl, azido, thio, or hydrocarbon-substituted amino. This second process aspect proceeds by replacing the carbon-bonded fluorine (or chlorine) of N-fluoroiminofluoro (or chloro)-acetonitrile, the compound of the general formula of the invention in which R is fluorine (or chlorine) and formed as illustrated in Example V, as follows:

(III)
$$NC-\overset{NF}{\underset{\|}{C}}-F + R^4H \text{ (or } R^4M\text{)} \longrightarrow NC-\overset{NF}{\underset{\|}{C}}-R^4 + HF \text{ (or } MF\text{)}$$

M being an alkali metal.

The compounds in which $R^4$ is alkoxy or cycloalkoxy can be made by reacting a monohydric alkanol of up to 19 carbons or a monohydric cycloalkanol of up to 7 carbons with the N-fluoroiminofluoroacetonitrile, as described above. This aspect is summarized in the examples which constitute Table I.

Compounds in which $R^4$ is azido are obtained by reacting an alkali metal azide, e.g., sodium or potassium azide, with N-fluoroiminofluoroacetonitrile. Compounds in which $R^4$ is thio, amino or hydrocarbon-substituted amino are obtained by reacting an alkyl mercaptan of up to 18 carbons, ammonia, or a mono- or dihydrocarbon-substituted amine of up to 18 carbons with N-fluoroiminofluoroacetonitrile. These aspects are summarized in the examples which constitute Tables II and III.

Compounds in which $R^4$ is $ArSO_2^-$ are obtained by reacting an alkali metal aryl sulfinate, i.e., an $MSO_2Ar$ compound, in which Ar is an aryl group of up to 7 carbons and M is an alkali metal such as sodium or potassium, with N-fluoroiminofluoroacetonitrile as in Example IX.

Examples VI through X, below, are illustrative of the preparation of compounds of this invention employing N-fluoroiminofluoroacetonitrile as a precursor.

In accomplishing the reaction of Equation III, it is convenient and practical to charge a reactor with a reaction medium of the kind previously described and the $R^4H$ (or $R^4M$) compound, cool to $-78°$ C. or lower, and add N-fluoroiminofluoroacetonitrile by allowing it to condense into the cooled reactor. The cooling bath (usually Dry Ice-acetone) is removed, the reaction mixture is allowed to attain ambient temperature, and any excess reactant is removed by evaporation or other means known to those skilled in the art. The reaction mixture is filtered, and the reaction medium is removed by distillation. The desired reaction product is isolated from the residue by extraction, followed by crystallization or by any method known to those skilled in the art.

Theoretically, N-fluoroiminofluoroacetonitrile and the other reactant react in 1:1 molar ratio. If desired, however, one or the other can be used in excess and after reaction is complete the excess removed by evaporation, distillation, or other method known to those skilled in the art.

As a rule the reaction between the N-fluoroiminocyanoacetonitrile and other reactant is conducted at atmospheric pressure. In some instances, however, it may be desirable to carry out the reaction in closed reactors under autogenous or even under superatmospheric conditions. Normally, however, this is not necessary and in the most generally useful aspects of the invention the reaction is conducted under atmospheric pressure conditions.

In practice it is preferred to add the N-fluoroiminofluoroacetonitrile to a solution of the other reactant in a normally liquid reaction medium of the kind previously described, maintained at temperatures below $-78°$ C., as attained by cooling in a solid carbon dioxide-acetone bath. After the addition is complete, the mixture is allowed to attain a temperature in the range of 20 to 30° C. In some instances application of external heating may be desirable and it is to be understood that 30° C. is not to be taken as a limiting upper temperature.

Usually the reaction is complete by the time the reaction mixture has attained ambient temperature. In some cases, however, it may be desirable to allow the mixture to stand with stirring for periods of up to one hour or more after it has attained ambient temperature.

There follow some nonlimiting examples submitted to illustrate the invention. In these examples, pressures are autogenous unless otherwise indicated. Nuclear magnetic resonance data were obtained using a high resolution spectrometer and associated electromagnet, both manufactured by Varian Associates, operating at 56.4 mc./sec. and approximately 14,000 gauss. Spectra were calibrated in terms of displacements in cycles per second (c.p.s.) from the $F^{19}$ resonance of F 112 (1,2-difluorotetrachloroethane). Negative frequency displacements indicate resonances occuring at lower field than the references.

EXAMPLE I

A. $CH_2=CHCN + N_2F_4 \xrightarrow{NaF} NC-\overset{NF}{\underset{\|}{C}}-CN + 3HF$ In a 240 cc. nickel-iron molybdenum alloy-lined pressure reactor containing 8.5 g. (0.15 mole) of acrylonitrile, 30 g. of o-dichlorobenzene, and 30 g. of sodium fluoride powder were condensed 17 g. (0.163 mole) of tetrafluorohydrazine, $N_2F_4$. The reactor was closed and heated stepwise first to 50° C. where it was held for one hour, then to 70° C. where it was held for one hour, then to 90° C. where it was held for one hour, and finally to 120° C. where it was held for three hours. Thereafter the reactor was allowed to cool to ambient temperature, opened, and the contents discharged. The composite product from three identical runs was distilled at atmospheric pressure through a 12-inch column. The product which was collected amounted to 29 g. (66% yield) and boiled at 65° to 66° C. (760 mm.).

Infrared analysis showed no absorption at 3.0μ, which is indicative of the absence of CH groups, absorption at 4.34μ showed presence of C≡N, at 6.45μ of C=N, and at 10.25μ of =N—F. The ultraviolet spectrum showed only end absorption and the $F^{19}$ nuclear magnetic resonance spectrum (N.M.R.) showed only one peak at —8880 c.p.c. The product, N-fluoroiminomalononitrile, analyzed:

*Analysis.*—Calcd. for $C_3N_3F$: C, 37.14%; N, 43.32%; F, 19.59%. Found: C, 38.39%; N, 44.30%; F, 19.48%.

B. Substitution of the acrylonitrile in the above example by methyl vinyl ether produces N-fluoroiminocyanomethyl methyl ether.

C. When octadecyl vinyl ether and cyclohexyl vinyl ether, respectively, are used in the process of the above example in place of the acrylonitrile, there are obtained N-fluoroiminocyanooctadecyl methyl ether and N-fluoroiminocyanocyclohexyl methyl ether.

D. If methyl vinyl ketone is used in place of the acrylonitrile, there is obtained N-fluoroiminocyanomethyl methyl ketone, and if hexadecyl vinyl ketone is used, there is obtained N-fluoroiminocyanomethyl hexadecyl ketone.

EXAMPLE II

A. 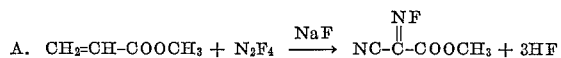

In an 80 ml. nickel-iron-molybdenum alloy-lined pressure reactor containing 10 g. of sodium fluoride powder, 6.0 g. (0.07 mole) of methyl acrylate, and 12 g. of acetonitrile was condensed 7.3 g. (0.07 mole) of $N_2F_4$. The reactor was sealed and heated to 71° C. for one hour and then to 125° C. for two hours. The sodium fluoride was separated by filtration, the solvent was evaporated from the filtrate, and the residue was distilled to give 3.0 g. of product as a colorless liquid, B.P. 67–68° C. (22 mm.); $N_D^{25}$, 1.4075. Infrared analysis showed absorption at 4.44μ (—CN), 5.73μ

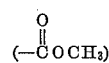

6.3μ (—CN), 10.2μ, 10.58μ, and 10.94μ (=NF). The $F^{19}$ N.M.R. spectrum showed single peaks at —7765 and —7340 cycles/sec. and the $H^1$ N.M.R. spectrum showed single peaks at $\tau^*$=5.92 and $\tau^*$=8.03 both in a ratio of about 16:1 indicating the presence of two stereoisomers, the predominant being the one with the fluorine and cyano groups in the synconfiguration. The product, methyl N-fluoroiminocyanoacetate, analyzed:

*Analysis.*—Calcd. for $C_4H_3N_2FO_2$: C, 36.93%; H, 2.33%; N, 21.54%; F, 14.61%. Found: C, 38.09%; H, 2.84%; N, 21.64%; F, 1456%.

B. When octyl acrylate and dodecyl acrylate, respectively, are used in the process of the above example in place of the methyl acrylate, there are obtained octyl N-fluoroiminocyanoacetate and dodecyl N-fluoroiminocyanoacetate.

EXAMPLE III

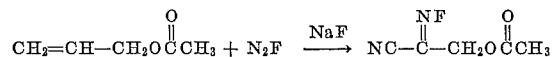

In a 240 cc. nickel-iron-molybdenum alloy-lined pressure reactor containing 6.0 g. (0.06 mole) of allyl acetate, 16 g. of sodium fluoride powder, and 20 g. of acetonitrile was condensed 8.0 g. of $N_2F_4$. The reactor was closed and heated to 70° C. for one hour and then to 130° C. for three hours. The sodium fluoride was removed by filtration, the solvent was evaporated from the filtrate, and the residue distilled to give 5.0 g. (58% yield) of the product as a colorless liquid, B.P. 47° C. (2.0 mm.);

---

*$\tau$=10 p.p.m. where the standard is $(CH_3)_4Si$.

$N_D^{25}$, 1.4100. Infrared analysis showed absorption at 4.44μ (CN), 5.73μ

6.25μ (C=N), 10.9μ (=N—F). The $F^{19}$ N.M.R. spectrum showed single peaks at —3740 c.ps. (syn) and —3395 c.p.s. (trans) in a 9/1 ratio while the proton nuclear magnetic resonance spectrum showed two doublets centered at $\tau$=4.9 ($CH_2$—O), the one for the syn-isomer having a coupling constant $\tau_{H-F}$=3.8 cycles/sec. and that for the anti-isomer having a coupling constant $\tau_{H-F}$=3.0μ. The —$CH_3$ group showed as two single peaks at $\tau$=7.84 (syn) and $\tau$=7.8 (anti) in a ratio of about 9:1. The product, 2-cyano-2(N-fluoroimino)ethyl acetate, analyzed:

*Analysis.*—Calcd. for $C_5H_5N_2FO_2$: C, 41.67%; H, 3.50%; N, 19.45%. Found: C. 40.11%; H, 4.03%; N, 19.35%.

EXAMPLE IV

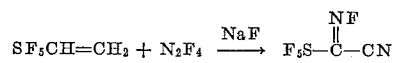

In an 80 cc. nickel-iron-molybdenum alloy-lined pressure reactor containing 7.5 g. of vinyl sulfur pentafluoride, 15 g. of o-dichlorobenzene, and 10 g. of sodium fluoride powder was condensed 6.0 g. of $N_2F_4$. The reactor was closed and heated to 130° C. for three hours. The volatile product was distilled in vacuo out of the high boiling solvent and fractionated at atmospheric pressure, B.P. 50–52° C., to give 1.5 g. of product. The infrared spectrum was transparent at 3.0μ (no CH), showed absorption at 4.44μ (CN), 6.3μ (C=N), and very strong absorption at 10–12μ ($SF_5$, =NF). The $F^{19}$ nuclear magnetic resonance spectrum showed characteristic peaks for $SF_5$ groupings at —7295 c.p.s. and a broad peak at —7500 c.p.s. for (=NF). Mass spectroscopic analysis was in agreement with the structure of cyano (N-fluoroimino)methyl sulfur pentafluoride.

EXAMPLE V

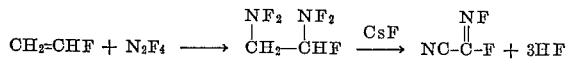

In a 240 ml. nickel-iron-molybdenum alloy-lined pressure reactor containing 25 g. of o-dichlorobenzene was condensed 9.0 g. (0.195 mole) of vinyl fluoride and 16 g. (0.154 mole) of $N_2F_4$. The reactor was sealed and heated to 103° C. for one hour. The solution thus obtained was combined with solutions obtained from two other identical experiments. The combined solutions were added dropwise, causing an exothermic reaction, to a well-stirred mixture of 160 g. of cesium fluoride in 150 ml. of o-dichlorobenzene and volatile products which were formed in the reaction were collected in a trap cooled to —78° C. with a solid carbon dioxide-acetone mixture. After completion of the addition, the mixture was heated to 80° C. for two hours. The volatile products obtained were condensed in a cylinder and amounted to 14.5 g. The volatile products were analyzed with a 12' x 0.25" O.D. column packed with 40 to 60 mesh commercial calcined diatomaceous earth coated with 20% by weight of a commercial 3,5,7,8-tetrachloroundecafluorooctanoic acid ethyl ester and operated at 0° C. with 60 cc./min. of helium carrier gas. Of the total sample analyzed, 17% eluted at 9.2 minutes and 53% at 11.0 minutes. In the material eluting at 9.2 minutes the fluorines are anti to each other while in the fraction eluting at 11.0 minutes the fluorines are syn to each other. The volatile fraction was therefore a mixture of anti and syn forms of N-fluoroiminofluoroacetonitrile.

The anti-isomer was identified by its F¹⁹ nuclear magnetic resonance spectrum, a doublet centered at −2923 cycles/sec. ($\tau_{NF-F}$=265 cycles/sec.) (=N—F), and a doublet centered at +1920 cycles/sec. ($\tau_{F-NF}$=265 cycles/sec.) (=C—F), the large coupling constants being characteristic of fluorines which are trans to each other around a carbon double bond. The infrared spectrum showed peaks at 4.24μ (CN), 6.05μ (doublet) (C=N), 7.65μ and 7.74μ (C—F), and 10.13μ, 10.17μ, and 10.26μ (=N—F). The boiling point was estimated to −3°+0.5° C.

The heat of vaporization, 6350 cal./mole, was derived from the vapor pressure curve, $$\log P_{mm} = \frac{-1390}{T} + 8.01$$

The syn-isomer was identified by its F¹⁹ nuclear magnetic resonance spectrum at −80° C., a doublet at −3650 cycles/sec. ($\tau_{NF-F}$=52 cycles/sec.) (=NF), and a doublet at 0 cycles/sec. ($\tau_{F-NF}$=52 cycles/sec.) (=CF), its infrared spectrum, 4.44μ (CN), 6.10μ (doublet) (C=N), 7.50μ, 7.55μ (C—F), and 10.00μ (broad) (=NF).

The boiling point was estimated at 2±0.5° C. and the heat of vaporization at 6580 cal./mole, from the vapor pressure curve, $$\log P_{mm} = \frac{-1440}{T} + 9.13$$

EXAMPLE VI

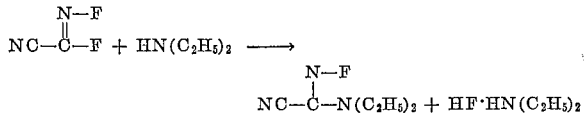

A reactor containing 25 ml. of ethyl ether and 5.0 g. of diethylamine was cooled in a solid carbon dioxide-acetone bath, evacuated and, 1.2 g. of syn-N-fluoroiminofluoroacetonitrile, prepared as in Example V, was condensed therein causing an exothermic reaction. The cooling bath was removed and the mixture was allowed to attain room temperature. The solid diethylamine salt was removed by filtration and the filtrate distilled to give 1.6 g. (84%) of product syn-N-fluoroimino-diethylaminoacetonitrile as a colorless liquid, B.P. 80° C. (4.0 mm.), $n_D^{25}$ 1.4502, $\lambda_{max.}^{liquid}$ 3.34μ, 3.29μ, 3.44μ (CH₂CH₃), 4.45μ (CN), 6.2μ (C=N, strong), 11.15μ (=N—F), $\lambda_{max.}^{EtOH}$ 252mμ (5100)

The F¹⁹ N.M.R. spectrum showed a single peak at −1670 c.p.s. and the proton N.M.R. showed a quartet centered at τ=6.5 and a triplet centered at τ=8.72 typical for ethyl groups.

*Analysis.*—Calcd. for C₆H₁₀N₃F: C, 50.33; H, 7.04; N, 29.36; F, 13.28. Found: C, 50.51; H, 7.84; N, 29.82; F, 12.94.

EXAMPLE VII

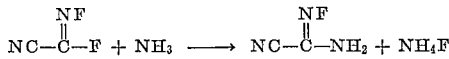

A reactor containing 25 ml. of ethyl ether and 5.0 ml. of anhydrous liquid ammonia was cooled in a solid carbon dioxide-acetone both evacuated, and 0.90 g. of anti-N-fluoroiminofluoroacetonitrile, prepared as in Example V, was added by condensation. The bath was removed, and the excess liquid ammonia allowed to evaporate. Water was added to the mixture, the ether layer was separated, dried, and evaporated to dryness to give 0.5 g. of crystalline residue, N-fluoroiminoaminoacetonitrile, which was recrystallized from benzene-hexane, M.P. 107–108° C.

$\lambda_{max.}^{KBr}$ 2.94μ, 3.12μ (NH₂), 4.38μ (CN), 6.06μ, 6.16μ (C=N), 11.07μ, 11.34μ (=N—F), $\lambda_{max.}^{EtOH}$ 224mμ (5400)

The F¹⁹ N.M.R. spectrum in

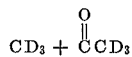

showed a single peak at −2110 c.p.s. and the proton N.M.R. spectrum showed a broad peak at τ=2.8 (NH₂).

*Analysis.*—Calcd. for C₂H₂N₃F: C, 27.61; H, 2.01; N, 48.30; F, 21.84. Found: C, 28.60; H, 2.64; N, 47.89; F, 21.55.

EXAMPLE VIII

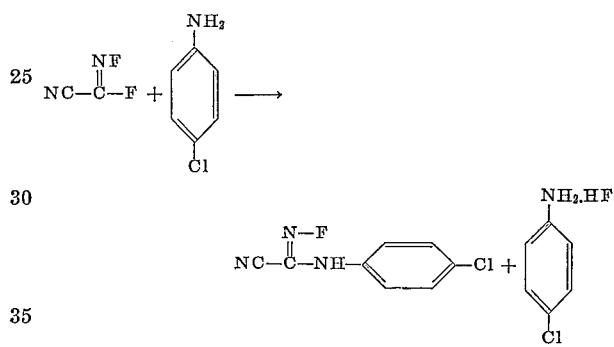

A flask containing 2.0 g. of p-chloroaniline and 15 ml. of ethyl ether was cooled in a solid carbon dioxide-acetone bath and evacuated and 0.6 g. of syn-N-fluoroiminofluoroacetonitrile added by condensation. The cooling bath was removed and the mixture was allowed to attain room temperature. The solid p-chloroaniline salt was removed by filtration and the ether was removed in vacuo from the filtrate to give a solid residue, N-fluoroimino-p-chloroanilinoacetonitrile, which was recrystallized from hexane to give 1.2 g. (90%) of product M.P. 106–108° C.

$\lambda_{max.}^{KBr}$ 3.08μ, 3.13μ (NH), 3.27μ (=CH), 4.44μ (CN), 6.16μ (C=N), 11.0μ (=NF) and 12.63μ (p-disubstituted benzene), $\lambda_{max.}^{EtOH}$ 230 mμ (8350), 272 mμ (8,060)

The F¹⁹ N.M.R. spectrum in CDCl₃ showed a single peak at −2810 c.p.s. and the proton N.M.R. showed a quadruplet centered at τ=1.7 typical for a p-disubstituted benzene.

*Analysis.*—Calcd. for C₈H₅N₃FCl: C, 48.63; H, 2.55; N, 21.27; F, 9.62; Cl, 17.94. Found: C, 49.32; H, 2.72; N, 21.10; F, 9.59; Cl, 18.14.

EXAMPLE IX

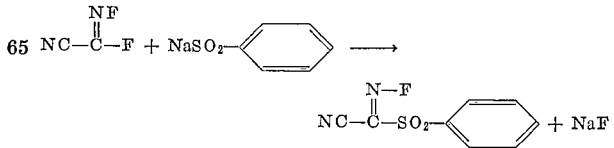

A flask containing 0.55 g. of sodium phenylsulfinate and 5.0 ml. of acetonitrile was cooled in a solid carbon dioxide-acetone bath, evacuated, and 0.3 g. of syn-N-fluoroiminofluoroacetonitrile prepared as in Example V, added by condensation. The cooling bath was removed and the mixture allowed to attain room temperature. Ethyl ether was added to the mixture, the sodium fluoride removed by filtration, and the solvent evaporated from the filtrate to give 0.3 g. of solid recrystallized from petroleum ether, N-fluoroiminocyanomethyl phenyl sulfonate, M.P. 65–66° C., $\lambda_{max.}^{KBr}$ 3.25μ (=CH), 4.47μ (CN)f 6.19μ (C=N), 7.32μ 8.68μ (SO$_2$), 10.54μ, 10.64μ, (=NF), $\lambda_{max.}^{EtOH}$ 217 mμ (~4220), 275 mμ (~2600)

the approximate values of the extinction coefficients being due to the non-linearity of the dilutions.

*Analysis.*—Calcd. for C$_9$H$_5$N$_2$FSO$_2$: C, 45.28; H, 2.38; N, 13.21. Found: C, 45.59; H, 2.47; N, 13.30.

Substitution of sodium tolylsulfinate for the sodium phenylsulfinate in the above process produces the N-fluoroiminocyanomethyl tolylsulfone.

EXAMPLE X

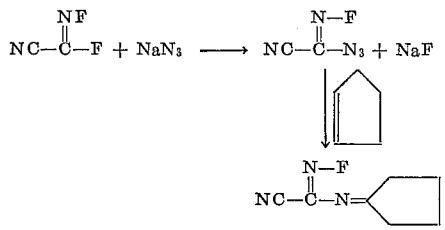

A reactor containing 0.41 g. of sodium azide (finely precipitated) and 5.0 ml. of acetonitrile was cooled in a solid carbon dioxide-ice-acetone bath, evacuated, and 0.60 g. of syn-N-fluoroiminofluoroacetonitrile, prepared as in Example V, was added by condensation. The bath was removed and the mixture allowed to attain ambient temperature. Examination of the solution by infrared showed peaks attributed to

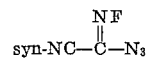

(syn - N - fluoroiminoazidoacetonitrile) at 4.65μ (N$_3$, strong), 6.35μ (C≡N), 7.65μ, 8.6μ, 10.30μ, 10.70μ (=NF), 12.13μ and 13.90μ.

The azido nitrile is explosive. Consequently, for recovery of the compound, an excess of cyclopentene (20 ml.) was added to the solution and the mixture stirred at room temperature until evolution of nitrogen had ceased. Ethel ether was added, the sodium fluoride was removed by filtration, and the solvent evaporated from the filtrate in vacuo. The oily residue was distilled immediately, using a short path still (temp. of bath 50° C. at 0.1 mm.) to give a colorless product which was analyzed immediately, $\lambda_{max.}^{liquid}$ 4.45μ (CN), 5.94μ (C=N—F, strong), 6.38μ (—N=<, weak), 10.85μ (=NF), $\lambda_{max.}^{EtOH}$ 270 (Sh.) (1250)

The F$^{19}$ N.M.R. spectrum showed two peaks at −4580 c.p.s. and −4405 c.p.s. in a 1:9 ratio indicating the presence of syn- and anti-isomers, and the proton N.M.R. showed two sets of multiplets at τ=7.6 and 8.05 in 1:1 ratio.

*Analysis.*—Calcd. for C$_7$H$_8$N$_3$F: C, 54.89; H, 5.27; N, 27.44; F, 12.41. Found: C, 55.57; H, 5.53; N, 27.32; F, 12.38.

Reaction of N-fluoroiminofluoroacetonitrile with a monohydric alkanol or cycloalkanol in the presence of an alkali metal or alternatively an alkali metal alcoholate at ambient temperatures produces the corresponding N-fluoroiminoalkoxyacetonitrile. Table I lists in the left column alcohols which can be reacted with the N-fluoroiminofluoroacetonitrile of Example V to produce the compounds listed in the right column.

*Table I*

| Example | Alcohol | Product |
|---|---|---|
| XII | C$_2$H$_5$OH | NC—C—OC$_2$H$_5$<br>‖<br>NF<br><br>N-fluoroiminoethoxy-acetonitrile |
| XIII | C$_4$H$_9$OH | NC—C—OC$_4$H$_9$<br>‖<br>NF<br><br>N-fluoroiminobutoxy-acetonitrile |
| XIV | C$_{12}$H$_{25}$OH | NC—C—OC$_{12}$H$_{25}$<br>‖<br>NF<br><br>N-fluoroiminododecyl-oxyacetonitrile |
| XV | H$_3$C—CH$_2$—CH(CH$_3$)—CH$_2$OH | NC—C—OCH$_2$—CH(CH$_3$)—CH$_2$—CH$_3$<br>‖<br>NF<br><br>N-fluoroimino-3-methylbutoxyacetonitrile |
| XVI | H$_3$C—C(CH$_3$)(CH$_3$)—CH$_2$—CH$_2$OH | NC—C—OCH$_2$—CH$_2$—C(CH$_3$)(CH$_3$)—CH$_3$<br>‖<br>NF<br><br>N-fluoroimino-2,2-dimethylbutoxy-acetonitrile |
| XVII | cyclohexanol (H\C(OH)/, H$_2$C/CH$_2$, H$_2$C\CH$_2$, \C/H$_2$) | cyclohexyl ester (H\C—O—C—CN, ‖NF, ring) <br><br>N-fluoroiminocyclohexyloxyacetonitrile |

In the left column of Table II are listed amines which can be substituted for the diethylamine of Example VI in the process of Example VI to produce the compounds listed in the right column.

Table II

| Example | Amines | Product |
|---------|--------|---------|
| XVIII | $HN(C_4H_9)_2$ | $(C_4H_9)_2-N-\underset{\underset{NF}{\|}}{C}-CN$ <br> N-fluoroimino-bis(N-butylamino)-acetonitrile. |
| XIX | $HN(C_{12}H_{25})_2$ | $(C_{12}H_{25})_2-N-\underset{\underset{NF}{\|}}{C}-CN$ <br> N-fluoroimino-bis(N-dodecylamino)-acetonitrile |
| XX | $HN-C_{10}H_{21}$ <br> $\|$ <br> $C_8H_{17}$ | $C_{10}H_{21}-N\underset{C_8H_{17}}{\|}\underset{NF}{\overset{\|}{C}}-CN$ <br> N-fluoroimino-N-(octyl-decylamino)-acetonitrile |
| XXI | (dicyclohexylamine structure) | (N-fluoroimino-bis(N-cyclohexylamino)-acetonitrile structure) <br> N-fluoroimino-bis(N-cyclohexylamino)-acetonitrile |
| XXII | $(C_6H_5)_2NH$ | $(C_6H_5)_2-N-\underset{\underset{NF}{\|}}{C}-CN$ <br> N-fluoroimino-bis(N-phenylamino)-acetonitrile |

In the left column of Table III are listed mercapto compounds which can be reacted with N-fluoroiminofluoroacetonitrile in accordance with the process described in Examples VI to X to produce the products listed in the right column.

Table III

| Example | Compound Reacted | Product |
|---------|------------------|---------|
| XXIII | $C_4H_9-S-H$ | $C_4H_9-S-\underset{\underset{NF}{\|}}{C}-CN$ <br> 1-N-fluoroiminothiabutylacetonitrile |
| XXIV | $C_{12}H_{25}-S-H$ | $C_{12}H_{25}-S-\underset{\underset{NF}{\|}}{C}-CN$ <br> 1-N-fluoroiminothiadodecylacetonitrile |

The products of this invention are useful as corrosion inhibitors. This use is illustrated below.

EXAMPLE A

Small pieces of copper and steel sheeting with clean surfaces were sealed in a tube containing N-fluoroiminomalononitrile, prepared as in Example I, and the tube was heated to 100° C. for 18 hours. Thereafter, the metal samples were removed from the tube and examined under a microscope. It was found that the copper and steel had been coated. The coated steel and a sample of uncoated steel were allowed to stand in water. The uncoated samples started to oxidize within 30 minutes while the coated samples remained unchanged for the first 12 hours and only after 72 hours was a small amount of oxidation noted.

Since obvious modifications and equivalents in the invention will be evident to those skilled in the chemical arts, I propose to be bound solely by the appended claims.

The embodiments of the invention in which an exclusive property or privilege is claimed are defined as follows:

1. N-fluoroiminocyano compounds of the formula $$R-\underset{\underset{NF}{\|}}{C}-CN$$

wherein R is selected from the group consisting of fluorine, chlorine, amino, cyano, alkoxy of up to 19 carbons, cycloalkoxy of up to 7 carbons, R'OCO—, R'CO—, R'COO— and R'COOCH$_2$—, R' being alkyl of up to 19 carbons, SF$_5$—, ArSO$_2$—, Ar being aryl hydrocarbon of up to 7 carbons, N$_3$—, and R$^2$S—, —NHR$^2$ and —NR$_2^2$, R$^2$ being selected from the group consisting of alkyl of up to 19 carbons, cycloalkyl of up to 8 carbons and aryl hydrocarbon of up to 17 carbons.

2. N-fluoroiminomalononitrile.
3. Methyl N-fluoroiminocyanoacetate.
4. 2-cyano-2(N-fluoroimino)ethyl acetate.
5. Cyano(N-fluoroimino)methyl sulfur pentafluoride.
6. N-fluoroiminofluoroacetonitrile.
7. N-fluoroimino-diethylaminoacetonitrile.
8. N-fluoroiminoaminoacetonitrile.
9. N-fluoroimino-p-chloroanilinoacetonitrile.
10. N-fluoroiminocyanomethyl phenyl sulfone.
11. N-fluoroiminoazidoacetonitrile.
12. The process which comprises reacting, at a temperature of about 60–175° C. and in the presence of an alkali metal fluoride, tetrafluorohydrazine and a monoolefinic compound of the formula R$^3$—CH=CH$_2$, R$^3$ being selected from the group consisting of fluorine, chlorine, cyano, alkoxy of up to 19 carbons, cycloalkoxy of up to 7 carbons, R'OCO—, R'CO—, R'COO— and R'COOCH$_2$—, R' being alkyl of up to 19 carbons, and SF$_5$—.

13. The process which comprises reacting, at about 60–175° C. and in the presence of an alkali metal fluoride, tetrafluorohydrazine and acrylonitrile.

14. The process which comprises reacting, at about 60–175° C. and in the presence of an alkali metal fluoride, tetrafluorohydrazine and methyl acrylate.

15. The process which comprises reacting, at about 60–175° C. and in the presence of an alkali metal fluoride, tetrafluorohydrazine and vinyl fluoride.

16. The process which comprises reacting, at a temperature of −78 to 30° C., (1) a member of the group consisting of N-fluoroiminofluoroacetonitrile and N-fluoroiminochloroacetonitrile and (2) a member of the group consisting of aryl sulfonates, alkali metal azides, alkanols, cycloalkanols, ammonia and mono- and dihydrocarbon substituted amines.

17. The process which comprises reacting N-fluoroiminofluoroacetonitrile and diethylamine.

18. The process which comprises reacting N-fluoroiminofluoroacetonitrile and ammonia.

19. The process which comprises reacting N-fluoroiminofluoroacetonitrile and an alkali metal phenylsulfinate.

20. The process which comprises reacting N-fluoroiminofluoroacetonitrile and an alkali metal azide.

No references cited.

WALTER A. MODANCE, *Primary Examiner.*

IRVING MARCUS, *Examiner.*